G. GODDU.
MACHINE FOR MAKING LACING HOOKS.
APPLICATION FILED OCT. 30, 1905.

1,030,725.

Patented June 25, 1912.

WITNESSES
Edward S. Day
A. G. Holt

INVENTOR
George Goddu
by his Attorneys
Phillips Van Everen & Fish

G. GODDU.
MACHINE FOR MAKING LACING HOOKS.
APPLICATION FILED OCT. 30, 1905.

1,030,725.

Patented June 25, 1912.
6 SHEETS—SHEET 4.

WITNESSES
Edward S. Day
A. G. Holt

INVENTOR
George Goddu
by his Attorneys
Phillips Van Everen & Fish

G. GODDU.
MACHINE FOR MAKING LACING HOOKS.
APPLICATION FILED OCT. 30, 1905.

1,030,725.

Patented June 25, 1912.

WITNESSES
Edward S. Day
A. G. Holt

INVENTOR
George Goddu
by his Attorneys
Phillips Van Everen & Fish

COLUMBIA PLANOGRAPH CO., WASHINGTON, D. C.

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR MAKING LACING-HOOKS.

1,030,725.    Specification of Letters Patent.    Patented June 25, 1912.

Application filed October 30, 1905. Serial No. 284,972.

*To all whom it may concern:*

Be it known that I, GEORGE GODDU, a citizen of the United States, residing at Winchester, in the county of Middlesex and State of Massachusetts, have invented certain new and useful Improvements in Machines for Making Lacing-Hooks; and I do hereby declare the following to be a full, clear, and exact description of the invention, such as will enable others skilled in the art to which it appertains to make and use the same.

The present invention relates to machines for making lacing hooks and is intended primarily as improvement on the machine disclosed in the pending application of Harrison H. Eaton and this applicant, Serial No. 167,673 filed July 31, 1903.

The machine disclosed in the application above referred to is a double blow rivet machine, of well known construction provided with blank holding and upsetting dies of novel construction which act upon blanks formed of short lengths of wire to produce the article shown in Figure 3 of the patent to Harrison H. Eaton for an improved lacing hook for shoes No. 11,874 reissued November 27, 1900, said article consisting of a straight body portion, a comparatively wide collar or base, and a tubular shank of considerably greater diameter than the body portion. In this machine, two upsetting dies are used which act successively upon a blank, the first upsetting die shortening the blank and slightly thickening that portion which is to form the collar and tubular shank and the second die forming the collar and tubular shank. It has been found that when the collar and tubular shank are formed by a single upsetting die great strain is put upon the die so that the small plunger or pin of the die, which is forced into the end of the blank to form the tubular shank, occasionally breaks. The plunger or pin of the die is necessarily hardened and considerable difficulty has been experienced in making a plunger which will stand the excessive strain to which it is subjected when forced into the end of the blank. Furthermore when a single upsetting die is used to form the collar and tubular shank, the excessive displacement of the metal at one operation causes it to crystallize more or less so that the hooks occasionally break in the subsequent operation of completing the hook by bending the body portion.

One of the objects of the present invention is to relieve the strain to which the upsetting dies are subjected and thereby prolong the life of the dies and particularly of the hardened plungers or pins and with this object in view the present invention contemplates forming the collar and tubular shank at two operations, two upsetting dies being provided, one of which forms a hole in the shank and a thick flange and the other of which completes the formation of the flange and the tubular shank. By the provision of these two dies less strain is put upon each die than when a single die is used, the metal of the blank is not crystallized during the upsetting operation and a larger as well as a more perfect collar and tubular shank can be formed. A further advantage secured by the use of two upsetting dies for forming the collar and tubular shank is that hooks can be manufactured from blanks of brass or other similar alloys or metals without injury to the plungers or pins of the dies. When a single die is used upon blanks of brass considerable trouble has been occasioned by the pins being coated with the brass. By the use of two dies the metal is not displaced to such an extent at each operation, less pressure is exerted by the metal upon the pins and as a consequence the pins do not become coated with the brass. It is desirable that the collar and tubular shank be of considerably greater diameter than the body portion of the hook and in order to secure this result without putting an excessive strain upon the dies which form the tubular shank and collar, the two upsetting dies above referred to are preferably used in connection with one or more upsetting dies which act upon the blank to thicken that portion which is to be formed into the collar and tubular shank. In the preferred form of the invention hereinafter specifically described two of these upsetting dies for thickening the end of the blank are provided which act successively on the blank prior to the operation thereon of the two dies which form the collar and tubular shank.

A further object of the present invention is to provide a machine for making lacing hooks which will operate at a greater speed than the machine disclosed in the application hereinbefore referred to. In the machine of that application but one blank holding die is provided and the two upsetting dies act alternately upon the blank so that two reciprocations of the cross-head carrying the upsetting dies is necessary to complete a hook. In accordance with a feature of the present invention a series of blank holding dies is provided and means for relatively moving the upsetting and blank holding dies to cause a blank to be presented to each upsetting die simultaneously and each blank to be acted upon successively by the upsetting dies. By means of this construction and arrangement of the blank holding and upsetting dies, a hook is completed at each reciprocation of the cross-head carrying the upsetting dies and the machine can therefore be operated at a much greater speed than a machine in which a blank is completed at each alternate reciprocation of the cross-head.

In addition to the features of invention above referred to, the present invention also consists in certain devices, combinations and arrangements of parts tending to simplify and improve the construction and improve the operation of machines for making lacing hooks. These constructions, arrangements and combinations of parts will be hereinafter described and claimed and their advantages will be obvious to those skilled in the art from the following description of the preferred embodiment of the invention.

The various features of the present invention will be clearly understood from an inspection of the accompanying drawings in which—

The machine illustrated in the drawings forms the hooks from a continuous wire and is completely automatic in its action. The machine comprises a wire feeding mechanism, mechanism for cutting a blank from the wire and transferring it to a position between a holding die and an upsetting die, a series of holding dies, a series of upsetting dies, mechanism for moving the upsetting dies toward and from the blank holding dies, mechanism for moving the holding dies to cause each die to be brought successively into line with each of the upsetting dies and means for discharging the completed hooks from the holding dies.

The wire from which the hooks are made is fed into the machine by means of two feed rolls indicated at 1 and 2. The wire 3 before reaching the feed rolls passes through a series of straightening rolls 4, across the top of a tank 5 and through a wire guide 6 which projects from the tank into close proximity to the rolls. The tank 5 contains oil which is applied to the wire by means of a wick 7 whereby the wire is cleaned and lubricated before reaching the feed rolls. The lower feeding roll 2 is secured to a shaft 8 journaled in stationary bearings and the upper feeding roll 1 is secured to a shaft 9 journaled in a sleeve 10 pivotally mounted at its outer end to allow the upper feeding roll to move toward and from the lower roll. The desired amount of pressure on the wire is secured by means of a leaf spring 11 which is interposed between the inner end of the sleeve 10 and the lower end of an adjusting screw 12. The shafts 8 and 9 are geared together so as to rotate in opposite directions and the shafts are actuated by means of a pawl and ratchet mechanism which operates to turn the shaft 8 intermittently. This pawl and ratchet mechanism comprises a ratchet wheel 13 secured to the shaft 8 a pawl carrier 14 mounted to turn loosely on the shaft 8 and two spring pressed pawls 15 and 16 mounted on the pawl carrier and arranged to engage the teeth of the ratchet wheel. During the operation of the machine, the pawl carrier 14 is oscillated and at each oscillation the feed rolls are actuated to feed a length of wire sufficient to form a blank. The oscillating movements are imparted to the pawl carrier by means of a cam groove 17 formed in a disk 18, a lever 19, one end of which is provided with a roll engaging the cam groove 17 and a link 20 connecting the other end of the lever 19 and the pawl carrier. The cam disk 18 is mounted upon a short shaft 21 and is provided upon its periphery with gear teeth which mesh with the teeth of a gear 22 secured upon the crank shaft 23 of the machine, and the shape of the cam groove 17 is such that one complete oscillation is imparted to the pawl carrier during each complete revolution of the crank shaft. The wire is fed into the machine by means of the feeding rolls until the end of the wire strikes an adjustable stop which will be hereinafter described. In order that the extent of the oscillating movements imparted to the pawl carrier 14 may be adjusted to secure a sufficient length of feed to bring the end of the wire into contact with the stop, the link 20 is adjustably connected to the pawl carrier. This adjustable connection consists of a block 24 to which the link 20 is pivoted and which is mounted to slide in a radial guide way in the pawl carrier. The block 24 is adjusted upon the pawl carrier by means of an adjusting screw 25 journaled in the carrier and having a screw-threaded engagement with the block. A locking nut 26 outside of the pawl carrier serves to lock the block 24 in its adjusted position.

Figures 1, 2:
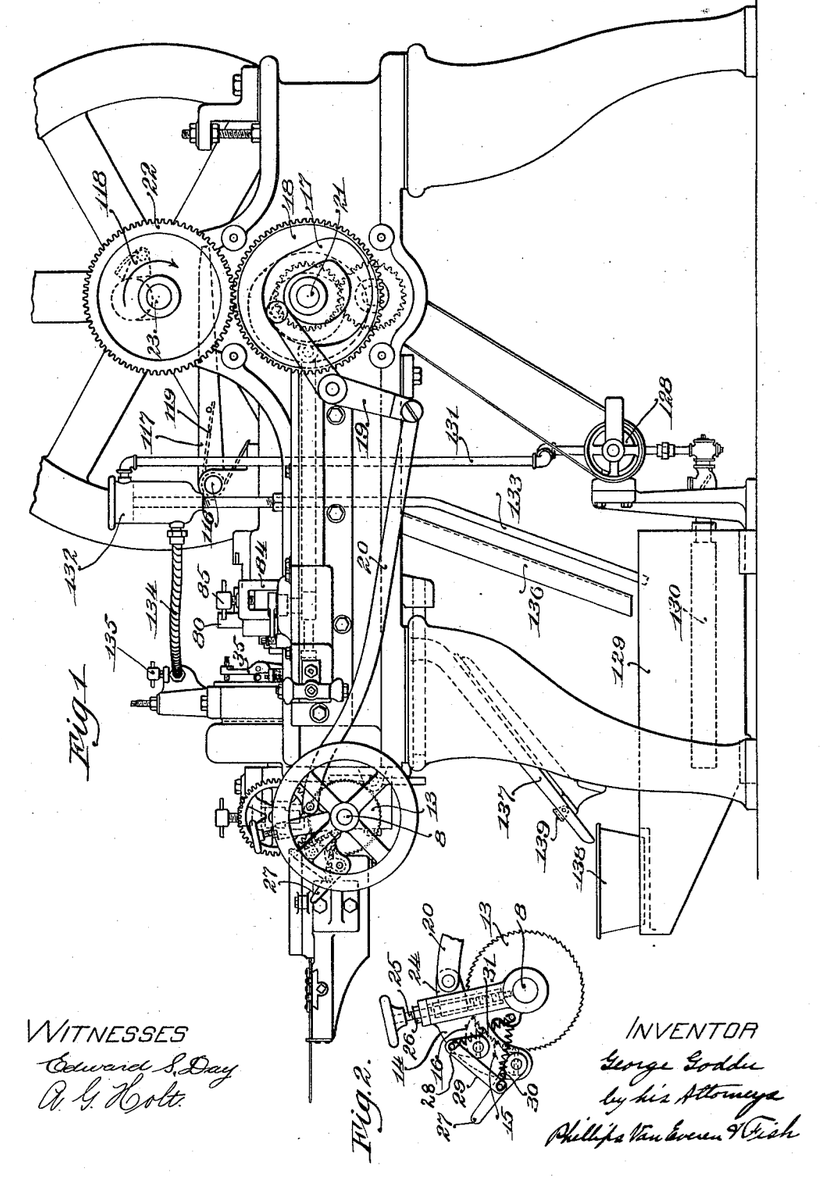
Fig. 1 is a view in side elevation of a machine embodying the same in their preferred form.
Fig. 2 is a detail view of a portion of the wire feeding mechanism.

It is often desirable during the operation of the machine to stop the feeding of the wire without stopping the entire machine and to secure this result the machine illustrated in the drawings is provided with means for disengaging the pawls 15 and 16 from the ratchet 13. As illustrated in Fig. 2, the short shafts to which the pawls 15 and 16 are secured are provided with arms 27 and 28 which are connected by a link 29 and the arm 27 is extended beyond the link to form a handle which may be grasped by the machine attendant. The springs for holding the pawls against the ratchet are indicated at 30 and 31 and are connected at one end to the pawl carrier and at the other ends to the arms 27 and 28. When the pawls are in engagement with the ratchet wheels, the springs act upon one side of the pivots of the pawls and press the pawls toward the ratchet wheel. When, however, the link 27 is depressed to raise the pawls from the ratchet wheel, the springs are moved so as to act upon the opposite sides of the pivots of the pawls and retain the pawls in the position to which they have been moved by the attendant.

From the feeding rolls the wire passes through a guide 32 and through a cutter tube 33, the guide 32 being secured to the frame of the machine and the cutter tube 33 being secured in a block 34 in which the carrier for the blank holding dies is mounted as will be hereinafter described.

The stop for limiting the feeding movement of the wire is indicated at 35 and is pivotally mounted upon a plate 36 secured to the block 34. The lower end of the stop 35 extends into the path of movement of the wire and at its upper end the stop is provided with an adjusting screw 37 which is held against the plate 36 by means of a spring 38 acting on the stop 35 and by means of which the stop 35 can be adjusted to determine the length of the blank which is to be cut from the wire.

Figures 6, 7, 8, 9:
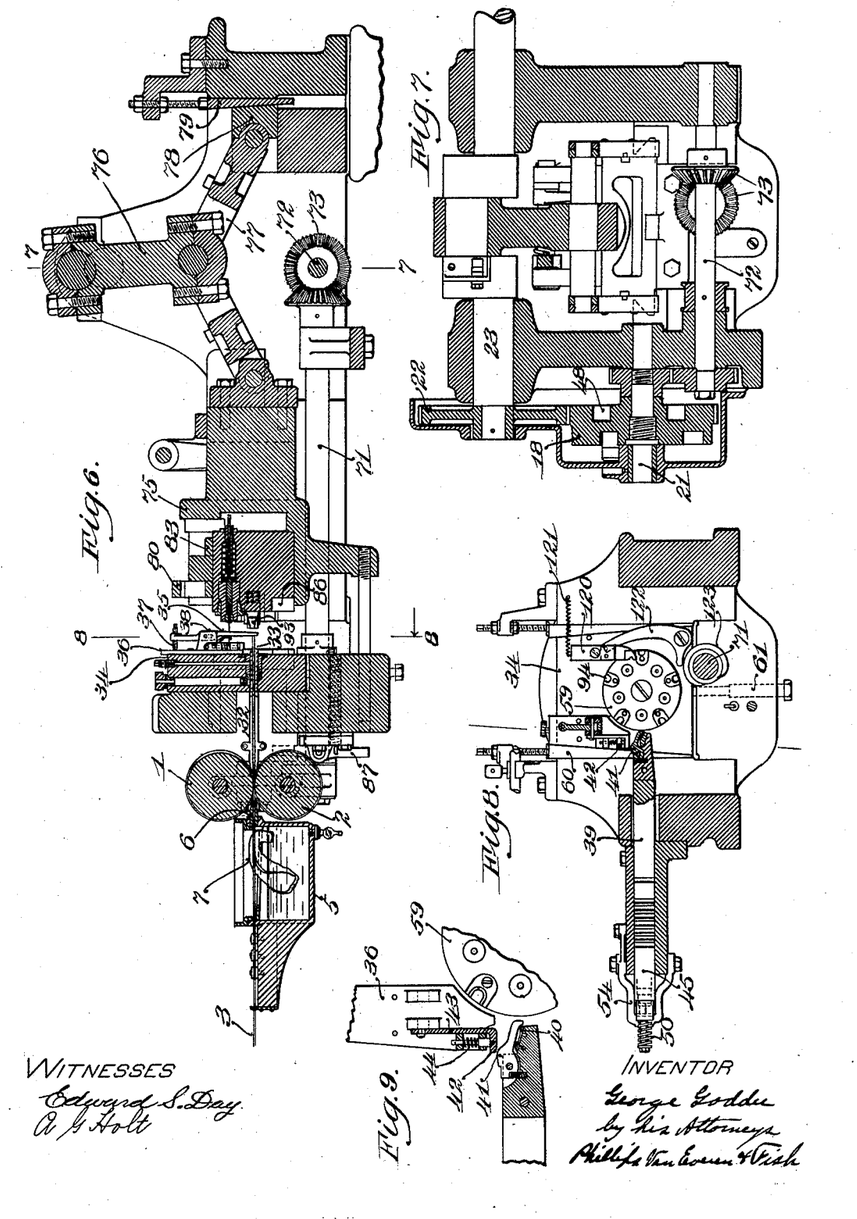
Fig. 6 is a vertical longitudinal sectional view of the machine, the general plane of the figure being indicated by the line 6—6 on Fig. 3 and the plane of the section through the carrier block for the upsetting dies being indicated by the line 6—6 on Fig. 12.
Fig. 7 is a cross sectional view of the machine taken on the line 7—7 of Fig. 6.
Fig. 8 is a cross sectional view of the machine taken on line 8—8 of Fig. 6 looking in the direction of the arrow.
Fig. 9 is a detail view illustrating the gripping jaw at the inner end of the cutter slide and the yielding abutment by which the jaw is held against the wire while a blank is being severed.

The mechanism for cutting a blank from the wire and transferring it to a position between a blank holding die and an upsetting die comprises a reciprocating cutter slide 39 mounted to reciprocate at right angles to the wire and provided at its inner end with a cutting block 40 and with a spring pressed clamping jaw 41. The block and the clamping jaw are shaped as illustrated in Figs. 8 and 9 to receive the end of the wire as it is fed forward against the stop 35, and the cutting block is adapted to coöperate with the outer end of the cutter tube 33 in severing a blank from the wire. It is necessary that the portion of the wire which is to form the blank be firmly held by the clamping jaw and cutter block while being severed from the wire, and to secure this result the machine illustrated in the drawings is provided with an abutment 42 which as illustrated consists of a flange at the lower end of a plate 43. The plate 43 is mounted on the plate 36 so as to be capable of a slight vertical movement and is yieldingly held in its lowest position by means of a spring 44 coiled around a rod projecting from the abutment 42 through two projections on the plate 36 and interposed between the upper projection and a shoulder on the rod. The abutment 42 is so placed in the machine that when the cutter block 40 and gripper 41 are in a position to receive the wire as it is fed into the machine, the abutment is out of engagement with the jaw. A very slight movement of the cutting block and jaw however, brings the jaw into engagement with the abutment so that the jaw is firmly pressed down against the wire while the blank is being severed. As the cutting block and jaw advance after the blank is severed, the jaw passes from beneath the abutment and is out of engagement therewith when the blank is in alinement with a holding die.

Figure 3:
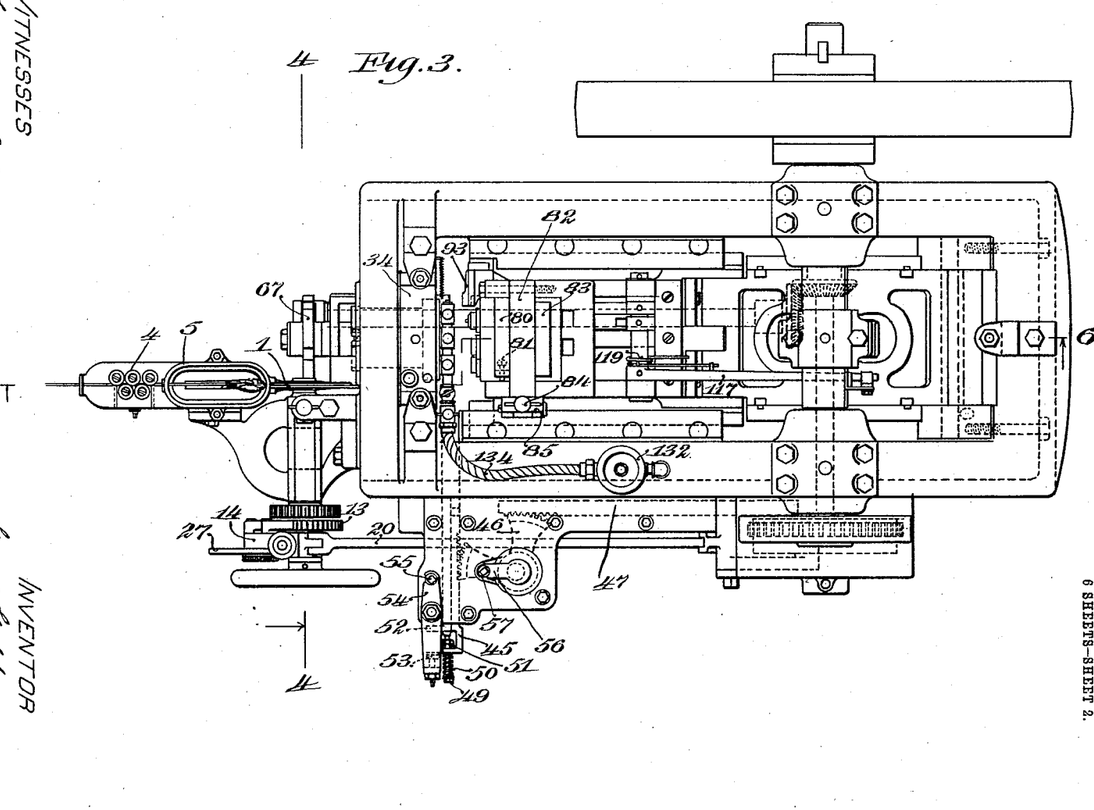
Fig. 3 is a plan view of the machine.
Figure 4:
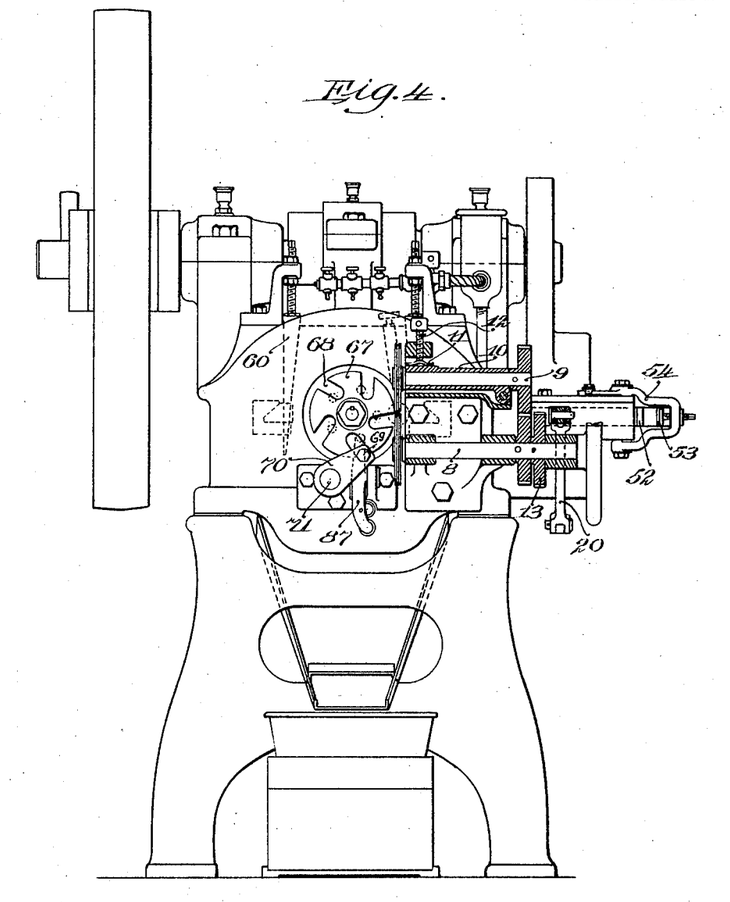
Fig. 4 is a view in front end elevation of the machine with a portion of the wire feeding mechanism shown in section, the plane of the section being indicated by the line 4—4 on Fig. 3.

The cutter slide 39 is adjustably secured to a slide 45 and this slide is actuated through a bell crank 46 and reciprocating slide 47 from a cam groove 48 in the cam disk 18, the slide 47 being provided with a roll engaging the cam groove and the bell crank 46 being provided with gear teeth at its ends meshing with racks on the slides 45 and 47. For the successful operation of the machine, it is necessary that the opening between the cutter block 40 and the clamping jaw 41 be in exact alinement with the wire when the slide 39 is at the limit of its backward movement. To insure this result a yielding connection is provided between the slide 39 and the slide 45 and an abutment is provided for stopping the backward movement of the slide 39. As illustrated in the drawings, see particularly Fig. 3, the slide 39 at its outer end is provided with a rod 49 which extends through a projection at the outer end of the slide 45. Between the projection on the slide 45 and the outer end of the rod 49 a coiled spring 50 is interposed and between the projection and the outer end of the slide 39 adjusting stop nuts 51 are provided. The outer end of the slide 39 is provided with a projection 52 which is arranged to come in contact with an adjustable stop 53. By means of this construction the slide 39 is positively actuated from the slide 45 during its forward movement, but during its backward movement, is actuated through the spring 50, which spring yields when the projection 52 on the slide 39 engages the stop 53. The backward movement of the slide 39 is regulated by the stop 53 and by adjusting the stop the opening between the cutting block 40 and gripping jaw 41 which receives the wire, may be brought into exact alinement with the wire when the slide is at the limit of its backward movement. By means of the adjusting nuts 51 the extent of the forward movement imparted to the slide 39 can be adjusted so that the blank will be in alinement with a holding die and an upsetting die when the slide is at the limit of its forward movement. To enable the slides 39 and 45 to be easily removed from the machine, the stop 53 is mounted in a frame 54 pivotally connected to the main frame of the machine and held in position by means of a locking screw 55. Also the pivot pin upon which the bell crank 46 is mounted is provided with an eccentric portion which acts to disengage the bell crank from the slide 45 when the pivot is turned. To enable the pivot pin to be turned it is provided at its upper end with a radial projecting arm 56 having a slot at its outer end which is engaged by a locking screw 57.

The blank holding dies are indicated at 58 and are five in number. These dies are secured in a rotatable die carrier 59 mounted in the block 34. The block 34 is received in a recess in the front portion of the machine frame and is held therein by adjustable side wedges 60 and an adjustable supporting screw 61, the provision of these wedges and screws being for the purpose of permitting the block 34 to be secured in the machine in a position in which the blank holding dies are in alinement with the upsetting dies. Each blank holding die is provided with an ejecting plunger 62 projecting from a slide mounted in the die carrier 59. These slides are provided at their outer ends with reduced portions which extend beyond the die carrier. The slides are acted upon by coiled springs 63 seated in recesses in the die carrier and bearing against disks secured to the slides, the action of these springs being to hold the slides and ejecting plungers retracted. The retracting movement of the slides is limited by removable stop plugs 64.

The die carrier 59 is supported in the block 34 by means of a bushing 65 which surrounds the carrier, and by means of a stud 66 extending axially through the carrier and journaled in a projection from the block. The stud 66 is utilized in rotating the carrier to cause each die holder to be brought successively into alinement with the upsetting dies, the carrier being secured to the stud so as to rotate therewith and the outer end of the stud being provided with a disk 67 provided with a series of slots 68. These slots 68 are engaged successively by a stud 69 in the outer end of the arm 70 secured to a longitudinal shaft 71 to which a constant movement of rotation is imparted from a shaft 72 through intermeshing bevel gears 73. The shaft 72 is geared to the shaft 21 and the proportion of the gears is such that the shaft 71 makes one complete revolution for each complete revolution of the crank shaft 23. The slots 68 correspond in number to the blank holding dies and are so arranged that during each revolution of the shaft 71 the die carrier 59 is rotated a distance equal to the distance between two dies.

The upsetting dies are four in number and are mounted in a die carrier 74 which is removably secured in a cross-head 75 mounted to reciprocate in guideways in the frame of the machine toward and from the blank holding dies, reciprocating movements being imparted to the cross-head by means of a crank on the crank shaft 23, a link 76 and a toggle lever 77. One member of the toggle lever is pivotally connected to the cross-head and the other member is pivotally connected to a block 78 which is mounted in the frame of the machine so as to be capable of adjustment by means of an adjusting wedge 79 to adjust the extent of the forward movement of the cross-head.

The carrier for the upsetting dies is substantially cylindrical in shape and is received in a recess in the forward end of the cross-head 75 semi-cylindrical in shape at its lower portion and provided with straight sides at its upper portion. The die carrier is provided with a handle 80 by which it may be conveniently lifted when it is desired to remove it from the machine, which handle projects upwardly from the die holder and serves as a means for preventing any rotative movement of the carrier, one side of the handle engaging one of the walls of the recess, and a set screw 81 (see Fig. 3) which projects from the other side of the handle engaging the opposite wall of the recess. The die carrier is held clamped in position in the recess by means of a bar 82 pivoted at one end to the cross-head and arranged to extend over the carrier between the handle 80 and a block 83 secured to the carrier. The free end of the bar 82 extends into a position to be engaged by a clamping screw 84 carried by a bail-shaped frame 85 pivoted to the cross-head 75 and arranged to be swung over the free end of the bar 82.

At each reciprocation of the cross-head 75 the four upsetting dies act upon the blanks in four of the blank holding dies, the blank which has been severed from the wire and transferred to a position in alinement with one of the blank holding dies being inserted in the holding die by one of the upsetting dies and being then acted upon by the die to thicken that portion which is to form the collar and tubular shank, and the other upsetting dies acting upon blanks which have been inserted in the blank holding dies and acted upon by one or more of the upsetting dies at previous reciprocations of the cross-head. The blank in the fifth blank holding die which is not acted upon by an upsetting die has been completed at the next preceding reciprocation of the cross-head, and during the reciprocation of the cross-head is ejected from the die, a recess 86 being provided in the die carrier 74 to allow the hook to be ejected. The completed hook is ejected by means of an ejecting lever 87 which is pivotally mounted upon the frame of the machine, and has its upper end arranged to engage the slide which carries the ejecting plunger of the blank holding die containing a completed hook. The lever 87 is actuated to move the ejecting plunger by means of a rod 88 mounted in the cross-head 74 and extending into a position to contact with the lower end of the lever. The return movement of the lever 87 is produced by means of a coiled spring 89 connecting the lower end of the lever to the frame of the machine. A stop 90 projecting from the frame of the machine limits the return movement of the lever.

Figure 11:
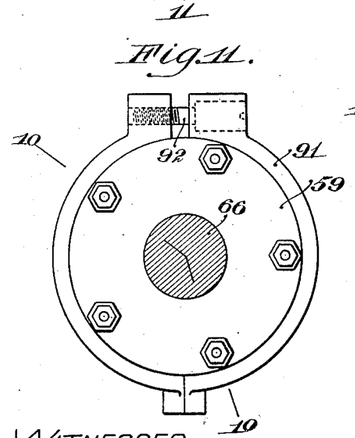
Fig. 11 is a detail sectional view taken on the line 11—11 of Fig. 10 illustrating the carrier for the holding dies and the brake shoes which surround the same.
Figure 12:
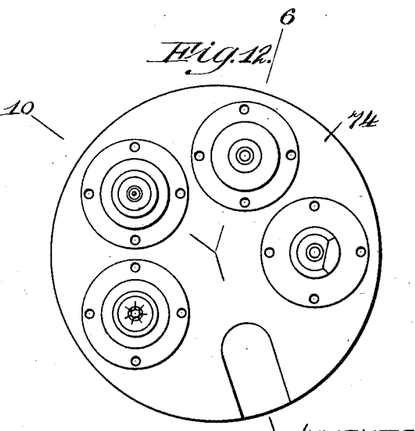
Fig. 12 is a face view of the carrier for the upsetting dies.

It is necessary that the blank holding dies be brought into exact alinement with the upsetting dies and held in alinement during the forward movement of the cross-head 75. To insure this result a brake is applied to the carrier 59 for the blank holding dies, and means are provided on the cross-head 75 which coöperate with the die carrier 59 to lock it in position during the forward movement of the cross-head. The brake is shown in detail in Fig. 11, and consists of two brake shoes 91 encircling the rear portion of the die holder 59. At their lower ends the brake shoes are provided with lugs which are received in an opening in the block 34, and at their upper ends are provided with lugs through which a clamping screw 92 passes. The means on the cross-head 75 for locking the die carrier 59 in position consist of a spring pressed plunger 93 provided with a wedge shaped portion which is adapted to engage correspondingly shaped recesses 94 in the die carrier.

Figures 13, 17:
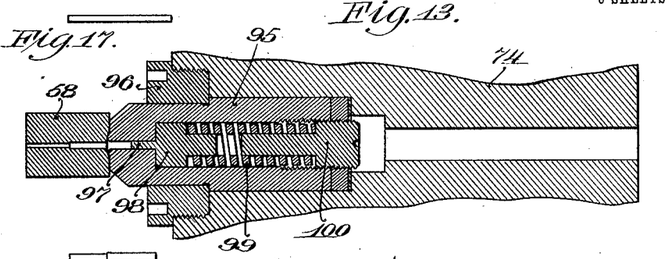
Figs. 13, 14, 15 and 16 are detail sectional views illustrating the construction of the four upsetting dies.
Figs. 17, 18, 19, 20 and 21 are detail views illustrating the blank at various stages in the operation of the machine, Fig. 17 showing the blank as it is severed from the wire, Fig. 18 showing the blank after being acted upon by the first upsetting die which thickens the portion which is to form the collar and tubular shank, Fig. 19 showing the blank after it has been acted upon by the upsetting die which still further thickens the portion of the blank which is to form the collar and tubular shank, Fig. 20 showing the blank after it has been acted upon by the upsetting die which forms a hole in the shank and a thick flange at the base of the body portion and Fig. 21 showing the blank in longitudinal section and end elevation after it has been completed by the action of the upsetting die which completes the formation of the collar and tubular shank.

The construction of the upsetting dies and the manner in which they act upon the blank will be clearly understood from an inspection of Figs. 13 to 21. The die which performs the first operation upon the severed blank is illustrated in Fig. 13. The body portion of this die is indicated at 95 and is received in a recess in the front face of the die carrier 74, being held therein by a locking nut 96. The die is provided with an ejecting plunger 97 which projects from a cylindrical block 98 mounted in a recess formed in the body portion of the die. The cylindrical block 98 is provided with a rearwardly extending reduced portion, and is acted upon by a coiled spring 99 interposed between the shoulder on the block 98 and a shoulder on a block 100 adjustably secured in the rear end of the body portion of the die. The block 100 is provided with a forwardly extending reduced portion and this portion acts as a stop to limit the backward movement of the block 98. In the operation of this die the blank shown in Fig. 17, which is held between the clamping jaw and cutter block on the cutter slide, enters the recess in the die and is engaged by the ejecting plunger 97. As the upsetting die advances the blank is inserted in the holding die 58 and then the ejecting plunger 97 is pushed backward until stopped by the block 100. After the backward movement of the ejecting plunger is stopped the ejecting plunger forms the bottom of the die cavity and during the continued forward movement of the die the blank is shortened and a portion thickened, the blank assuming the shape illustrated in Fig. 18.

The die which performs the second operation on the blank is similar in its mode of operation to the die illustrated in Fig. 13, but differs slightly therefrom in construction. The body portion of the die is held in the die carrier 74 in the same manner. The block which carries the ejecting plunger is provided with a rearwardly extending portion 101 which extends through a sleeve 102 adjustably secured in the die holder 74 and projecting into a recess formed in the carrier 74 back of the upsetting die. A coiled spring 103 is seated in this recess and acts upon a washer 104 which in turn acts upon the shoulder of the cylindrical block carrying the ejecting plunger. This die acts to still further shorten the blank and thicken a portion thereof, the condition of the blank after being operated upon by this die being illustrated in Fig. 19.

Figures 15, 16, 19, 20, 21:
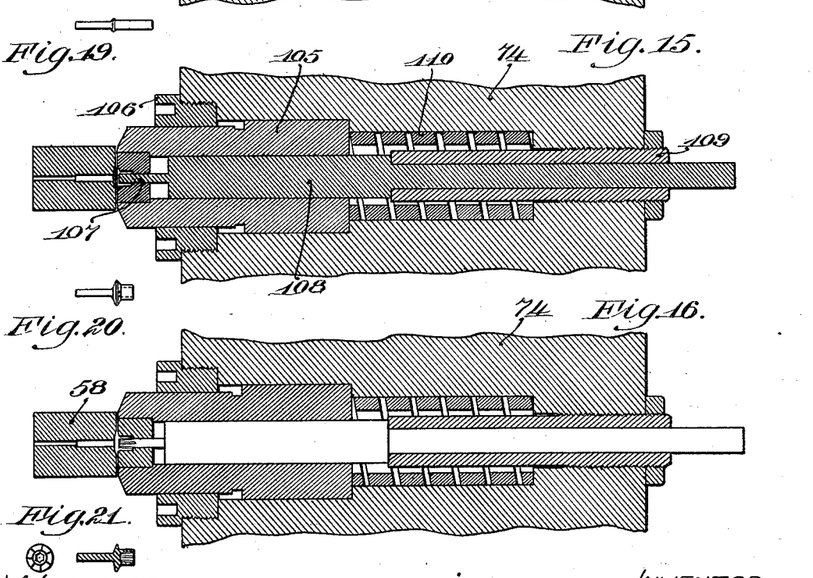

The dies which perform the third and fourth operations on the blank are of substantially the same construction. The body portion of each die is indicated at 105 and is mounted in the carrier 74 so as to have a longitudinal movement therein, the forward movement of the die in the carrier being limited by the locking nut 106 and the rearward movement being limited by a shoulder at the back of the recess in which the die is mounted. Each die is provided with a plunger 107 projecting from a block 108 mounted to slide in the body portion of the die. The block 108 is reduced in diameter at its rear and projects through a sleeve 109 adjustably mounted in the carrier 74. A coiled spring 110 surrounds the sleeve 109 and bears against the body portion 105 of the die. In the operation of each of these dies the plunger is forced rearwardly by contact with the blank so that it does not act upon the blank until the body portion of the die has come in contact with the blank holding die. The backward movement of the plunger 107 is limited by the engagement of the block 108 with the sleeve 109 which engagement takes place during the first portion of the rearward movement of the body portion of the die with relation to the die carrier. The thickened portion of the blank is thus surrounded by the body portion of the die before the plunger 107 acts on the blank and as the plunger is forced into the blank the metal is displaced and fills the cavity between the body portion of the upsetting die and the blank holding die. The die which performs the third operation forms a hole in the end of the thickened portion of the blank and a thick collar, the condition of the blank after this operation being illustrated in Fig. 20. The die which performs the fourth and final operation on the blank completes the formation of the collar and tubular shank. The completed hook which results from this operation is illustrated in Fig. 21. The die which performs the final operation upon the blank also acts to score the tubular shank and to rib the under surface of the collar, the body portion of the die and plunger being shaped to produce this result as will be apparent from an inspection of Figs. 16 and 21. The object of scoring the tubular shank and ribbing the under surface of the collar is to cause the shank to be split evenly when the hook is secured to a shoe upper and to hold the hook from rotation after being secured in position.

Figure 10:
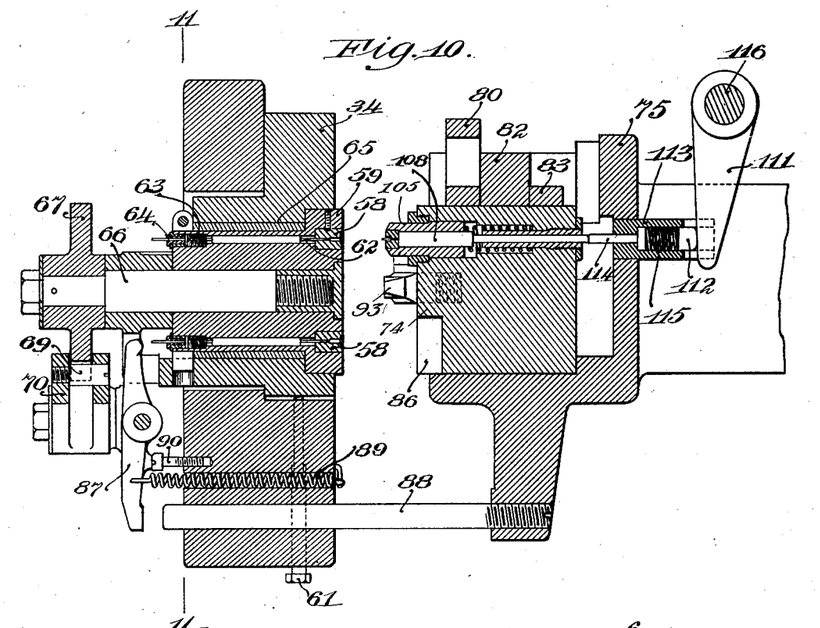
Fig. 10 is a detail sectional view of the carriers for the blank holding and upsetting dies, together with the parts of the machine adjacent thereto; the general plane of the figure being vertical and the plane of the section through the die carriers being indicated by the line 10—10 on Fig. 11 and the line 10—6 on Fig. 12.
Figures 14, 18:
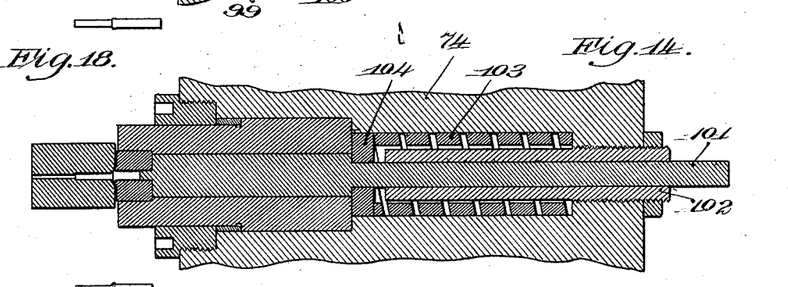

The blanks which have been acted upon by the upsetting dies illustrated in Figs. 13 and 14, are held in the blank holding dies during the backward movement of the reciprocating cross-head 75 by means of the ejecting plungers which free the blanks from the upsetting dies. In order to hold the blank which has been acted upon by the upsetting die illustrated in Fig. 15 during the backward movement of the cross-head 75 means are provided for holding the plunger 107 in contact with the blank until the body portion of the die has released the blank. This mechanism comprises an arm 111 (see Fig. 10) which is actuated from the crank shaft at the proper time during the operation of the machine and which bears against a block 112 mounted to slide in a sleeve 113 secured in the cross-head 75. Also mounted in the sleeve 113 is a plunger 114 which is arranged to engage the rear end of the block 108 which carries the plunger 107 of the die illustrated in Fig. 15. Between the plunger 114 and the block 112 a spring 115 is interposed which allows the plunger of the die to recede when first brought into contact with the blank. The arm 111 is secured to a shaft 116 mounted in the cross head and to the shaft 116 is also secured an arm 117 which is arranged to be engaged by a cam projection 118 on the crank shaft 23. A spring 119 acts on the arm 117 and holds the arm in the path of movement of the projection 118.

The mechanism above described for holding the plunger 107 in contact with the blank during the first portion of the backward movement of the cross-head 74 prevents the body portion of the die from withdrawing the blank from the holding die. To prevent the plunger 107 from withdrawing the blank from the holding die an arm 120 is provided (see Fig. 8) pivotally mounted upon the block 34 and provided with a recess at its lower end adapted to engage the shank portion of the hook below the collar and hold the blank in the die while the plunger of the upsetting die is being withdrawn. The arm 120 is acted upon by a spring 121 which moves the lower end of the arm toward the blank and is also acted upon by a lever 122 which acts to move the lower end of the arm away from the blank. The lever 122 is actuated by means of a cam 123 on the shaft 71.

Figure 5:
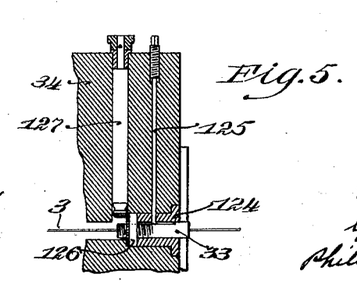
Fig. 5 is a detail sectional view illustrating a construction for supporting and adjusting the wire cutting tube.

The outer end of the cutter tube 33, hereinbefore referred to, constitutes a cutting edge which coöperates with the cutter block 40 in severing a blank. To enable the end of the cutter tube to be brought into proper position with relation to the cutting block it is adjustably mounted in the block 34 as illustrated in detail in Fig. 5. As shown in this figure the tube 33 is mounted in a bushing 124 and is held from rotation by means of a pin 125 which engages a slot in the tube. The tube is screw-threaded and is engaged by an adjusting nut 126 seated in a recess in the block 34. The nut is provided with bevel gear teeth which mesh with a bevel gear upon the lower end of a vertical shaft 127 by means of which the cutter tube can be conveniently adjusted.

It is desirable that oil be supplied to the upsetting dies during the operation of the machine. A simple and convenient means for supplying oil to the dies is illustrated in the drawings. The oil is supplied by means of a pump indicated at 128, which is driven by a belt from a pulley on the shaft 72. The pump draws oil from a reservoir 129 through a strainer 130 and delivers it through a pipe 131 to a receptacle 132. From the receptacle 132 an overflow pipe 133 leads back to the reservoir 129. A flexible tube 134 leads from the receptacle 132 to a series of stop cocks 135 mounted above the blank holding dies. The excess of oil which drips from the upsetting dies is directed back to the reservoir by means of a depending plate 136.

The completed hooks which are ejected from the blank holding dies fall upon a delivery chute 137 and pass from the chute into a suitable receptacle indicated at 138. At the lower end of the chute a pivoted gate 139 is provided which may be swung down into a position to intercept the hooks when it is desired to inspect the hooks which are being made at any particular time.

The operation of the machine illustrated in the drawings and above described will be clearly understood by those skilled in the art from the description of the construction and arrangement of its various parts already given.

The nature and scope of the present invention having been indicated and the preferred form of the invention having been specifically described, what is claimed is:—

1. A machine for making lacing hooks, having, in combination, blank holding and upsetting dies and means for actuating the same, wire feeding mechanism, a cut-off slide provided with a cutting block, mechanism for actuating the slide to sever a blank and transfer it to a position in line with a blank holding die, the mechanism for actuating the slide including a yielding connection, and a stop for stopping the slide with the cutting block in position to receive the wire.

2. A machine for making lacing hooks, having, in combination, a blank holding die, an upsetting die coöperating therewith comprising a body portion provided with a die cavity and a plunger operating therein, means for actuating the dies to upset the end of the blank to form a collar and tubular shank and means for holding the plunger in contact with the blank until the blank has been released by the body portion of the upsetting die.

3. A machine for making lacing hooks, having, in combination, blank holding and upsetting dies and means for actuating the same, wire feeding mechanism, a cut-off slide provided with a cutting block, and with a wire clamping jaw, mechanism for moving the slide from a position in which the wire receiving opening between the cutting block and jaw is in line with the wire to a position in which the opening is in line with a blank holding die, and a yielding abutment arranged to engage the jaw and force it against the wire while the blank is being severed.

4. A machine for making lacing hooks, having, in combination, blank holding and upsetting dies and means for actuating the same, wire feeding mechanism, a cut-off slide provided with a cutting block, and with a wire clamping jaw, mechanism for moving the slide from a position in which the wire receiving opening between the cutting block and jaw is in line with the wire to a position in which the opening is in line with a blank holding die, and an abutment arranged to force the jaw against the wire while the blank is being severed and be out of engagement with the jaw when the jaw and cutting block are at the limit of their movement in each direction.

5. A machine for making lacing hooks, having, in combination, a blank holding die, an upsetting die coöperating therewith provided with a die cavity and a plunger operating therein to form a hole in the end of the blank and the collar, and means for actuating the dies to upset the end of the blank to form a collar and tubular shank.

6. A machine for making lacing hooks, having, in combination, a series of blank holding dies, a carrier therefor, an upsetting die, a cross-head in which the upsetting die is mounted, means for moving the cross-head toward and from the blank holding dies, means for actuating the carrier to bring each blank holding die successively into alinement with the upsetting die, and a spring pressed plunger carried on the cross-head and provided with a wedge shaped portion adapted to engage correspondingly shaped recesses in the die carrier to lock the die carrier in position during the forward movement of the cross-head.

7. A machine for making lacing hooks having, in combination, a blank holding die, an upsetting die having a die cavity and a plunger movable therein and adapted to form a hole in the end of the blank and a thick collar, a second upsetting die provided with a die cavity and a plunger movable therein and coöperating with the blank holding die to complete the collar and tubular shank and means for actuating the dies to cause the upsetting dies to act successively on the blank, substantially as described.

8. A machine for making lacing hooks having, in combination, a blank holding die, an upsetting die adapted to shorten the blank longitudinally and thicken a portion thereof, an upsetting die having a die cavity and a plunger movable therein to form a hole in the end of the thickened portion of the blank and a thick collar, an upsetting die having a die cavity and a plunger movable therein to complete the collar and tubular shank, the several upsetting dies all coöperating with the blank holding die to form the finished blank and means for actuating the upsetting dies to cause the dies to act successively on the blank, substantially as described.

9. A machine for making lacing hooks having, in combination, a blank holding die, an upsetting die to shorten the blank and thicken a portion thereof, an upsetting die adapted to still further shorten and thicken the blank, an upsetting die having a die cavity and a plunger movable therein to upset the thickened portion of the blank to form a collar and a tubular shank, the several upsetting dies all coöperating with the blank holding die and means for actuating the upsetting dies to cause the dies to act successively on the blank, substantially as described.

10. A machine for making lacing hooks having, in combination, a plurality of blank holding dies provided with ejecting plungers, a carrier for said dies, a series of upsetting dies adapted to coöperate successively with each blank holding die and produce by a plurality of steps a finished blank, mechanism for actuating the ejecting plungers and means for actuating the carrier to bring each blank holding die successively into alinement with each upsetting die and then into operative relation with the mechanism for actuating the ejecting plungers, substantially as described.

In testimony whereof I affix my signature, in presence of two witnesses.

GEORGE GODDU.

Witnesses:
 FRED O. FISH,
 FARNUM F. DORSEY.

---

Copies of this patent may be obtained for five cents each, by addressing the "Commissioner of Patents, Washington, D. C."